United States Patent Office 3,060,953
Patented Oct. 30, 1962

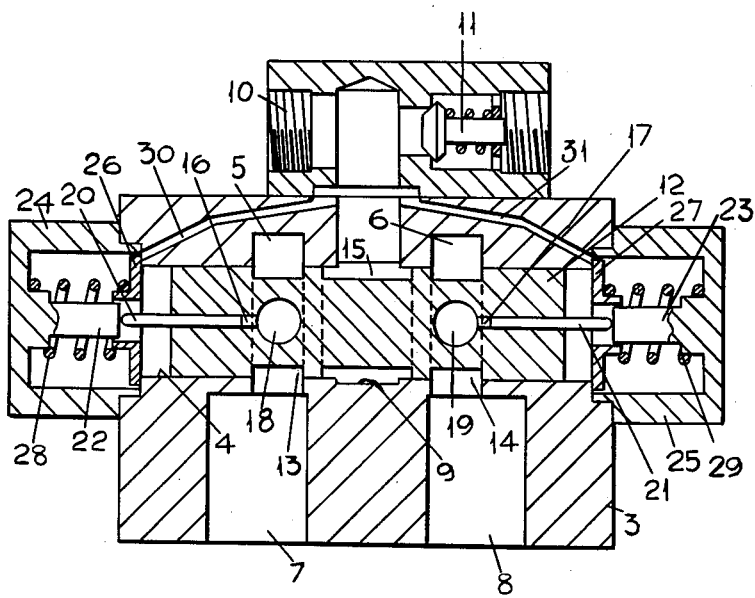

3,060,953
PRESSURE SENSITIVE VALVES
John Harbidge, Birmingham, England, assignor to Joseph Lucas (Industries) Limited, Birmingham, England
Filed Mar. 10, 1961, Ser. No. 94,851
Claims priority, application Great Britain Mar. 18, 1960
2 Claims. (Cl. 137—101)

The object of this invention is to provide an improved valve for limiting the pressure differential between a pair of fluid flow lines.

A valve in accordance with the invention comprises in combination a body part in which is formed a cylindrical bore, a pair of spaced circumferentially extending recesses in the wall of said bore, each of said pair of recesses being adapted for connection to one of the flow lines respectively, a third circumferentially extending recess in the wall of said bore at a position intermediate said pair of recesses, said third recess being adapted for connection to a boost pump, a shuttle fitting within the bore in the manner of a piston, a pair of spaced circumferentially extending grooves in the periphery of the shuttle arranged to register with the pair of recesses respectively when the shuttle is at a mid-way position in the bore, a third circumferentially extending groove in the shuttle arranged to register with the third recess when the shuttle is in a mid-way position, a pair of axial passages in the ends of the shuttle respectively, the inner ends of said passage being in communication with said pair of grooves respectively, a pair of plungers occupying the pair of passages respectively, a pair of abutments against which the outer ends of the plungers are adapted to bear, and a pair of spring-loaded stop means at opposite ends of the bore respectively, the valve being arranged to operate substantially as herein described.

The accompanying drawing shows a longitudinal section through one example of the invention which may be used for limiting the differential pressure between the two flow lines of a hydraulic vehicle transmission mechanism of the kind employing an engine driven pump for supplying motive liquid to a hydraulic motor for driving the wheels of the vehicle. In such a mechanism the one line (hereinafter termed the high pressure line) serves to transmit the motive fluid during the period in which the engine is driving the wheels of the vehicle, and the other line (herein after termed the low pressure line) under similar circumstances tends to return the fluid from the motor to the pump. However, when the wheels of the vehicle tend to drive the engine under circumstances normally known as "over run," the low pressure line becomes the line carrying the higher pressure and the high pressure line merely serves to return fluid from the pump to the motor.

The illustrated valve comprises a body part 3 in which is formed a cylindrical bore 4. In the wall of this bore are formed a pair of spaced and circumferentially extending recesses 5 and 6 which are in communication with ports 7 and 8 respectively adapted for connection to the high pressure and low pressure lines (not shown) of the system. Between the recesses 5 and 6 is a third circumferentially extending recess 9 which is in communication with an inlet 10 in the body part 3 adapted for connection to a boost pump (not shown) for supplying replenishment fluid to the system to make up any losses due to leakage. Moreover, adjacent the inlet 10 is a spring-loaded relief valve 11 through which fluid can escape to the reservoir (not shown) when the pressure in the system exceeds a predetermined value.

Within the bore 4 is a cylindrical shuttle 12 on the periphery of which are formed three axially spaced and circumferentially extending grooves 13, 14 and 15 respectively. When the shuttle is in a mid-way position within the bore (as illustrated) the groove 13 is in register with the recess 5, the groove 14 is in register with the recess 6, and the groove 15 is in register with the recess 9, relative to which it is wider in an axial direction.

Extending into the ends of the shuttle 12 respectively are a pair of axially extending cylindrical passages 16 and 17 which at their inner ends are in communication with the grooves 13 and 14 respectively through radial passages 18 and 19 in the shuttle. In the pair of passages 16 and 17 respectively are a pair of cylindrical plungers 20 and 21 the outer ends of which bear against abutments 22 and 23 formed by central cylindrical stems extending within a pair of caps 24 and 25 respectively closing the outer ends of the bore 4. The internal diameter of each cap is greater than the diameter of the bore 4 and slidable upon the stems 22 and 23 are washers 26 and 27 respectively which normally are held against the ends of the bore by means of springs 28 and 29 and serve as stops for the shuttle 12. The interiors of the caps 24 and 25 are also interconnected with the inlet 10 in the body part 3 by means of a pair of passages 30 and 31 respectively formed in the latter.

When the pressure in the high pressure line (connected to the port 7) is above that in the low pressure line (connected to the port 8) the higher pressure acting on the plunger 20 will cause the shuttle to be moved until it bears against the stop washer 27. In this position the groove 15 will establish communication between the low pressure line and the boost pump with the result that, if the pressure in the low pressure line has fallen below the pressure of the boost pump, it will be made up to the pressure of the boost pump delivery. Should the differential pressure between the high and low pressure lines continue to rise the shuttle 12 will be moved further in the same direction, against the action of the spring 29 acting on the stop washer 27, until the groove 13 establishes partial communication between the high pressure line and the recess 9 which is in turn in communication with the low pressure line through the groove 15. As a result fluid can be split from the high pressure line into the low pressure line until the differential pressure between the two lines falls to the predetermined value which is determined by the rating of the spring 29. Conversely should the pressure in the low pressure line rise above that in the high pressure line the shuttle 12 will be moved in the opposite direction so as to limit the differential pressure in exactly the same manner.

Having thus described my invention what I claim as new and desire to secure by Letters Patent is:

1. A valve for controlling the relative pressures in a pair of fluid flow lines, comprising in combination a body part provided with a cylindrical bore, a pair of spaced circumferential recesses in the wall of said bore, a third circumferential recess in the wall of said bore at a position between, and spaced from, said pair of recesses, a pair of ports which communicate respectively with said pair of recesses, and which are connectible respectively to the fluid flow lines, and a pressure fluid inlet in communication with said third recess, a shuttle slidably fitting within said bore in the manner of a piston, and having in its periphery a pair of spaced circumferential grooves, and a third circumferential groove situated between, and spaced from, said pair of grooves, the spacing of the three grooves being such that, when the shuttle occupies a mid-way position in said bore, said pair of grooves register respectively with said pair of recesses, and said third groove registers with said third recess, and said shuttle being provided at opposite ends respectively with a pair of coaxial passages, and being also provided with a pair of radial passages through which the inner ends of said coaxial passages communicate respectively with said pair of grooves, a pair of plungers in slidable engagement with, and extending from the outer ends of, said coaxial passages respectively, a pair of abutments which are secured to said body part at positions adjacent the opposite ends respectively of said bore, and against which the outer ends of said plungers are respectively bearable, and a pair of spring-loaded annular stops which are mounted at opposite ends respectively of said bore in positions nearer to the corresponding ends of said shuttle than said abutments so that said shuttle comes into contact with one of said stops when moved in one direction by fluid pressure in one of said ports, and comes into contact with the other of said stops when moved in the opposite direction by fluid pressure in the other of said ports.

2. A valve according to claim 1, and having a pressure relief valve in communication with said inlet.

References Cited in the file of this patent

UNITED STATES PATENTS

| | | |
|---|---|---|
| 1,588,657 | Christensen | June 15, 1926 |
| 2,266,921 | Trautman | Dec. 23, 1941 |